United States Patent Office 2,880,102
Patented Mar. 31, 1959

2,880,102

WELL CEMENTING COMPOSITIONS AND METHOD OF PREPARING THE SAME

George W. Woodard and Charles L. Lunsford, Tulsa, Okla., assignors to The Dow Chemical Company, Midland, Mich., a corporation of Delaware No Drawing. Application April 12, 1956
Serial No. 577,657

6 Claims. (Cl. 106—90)

This invention relates to cementing compositions and their method of preparation. More particularly, it relates to oil well cements containing colloidal clays which need not be premixed prior to slurrying. Still more particularly, it relates to a delayed swelling, colloidal clay-containing well cement containing an agent to retard the swelling of the clay.

Conventional oil well cements containing a hydraulic cement, a colloidal clay and various additaments in small proportions are known. They are generally supplied as premixes, to be slurried with water for use at the well site. The premixing of cement and clay provides uniform slurries, whereas the consecutive mixing of clay and cement individually without premixing them results in non-uniform slurries in which neither the clay nor the cement is evenly dispersed.

It has now been discovered that cements can be prepared at the site at which the cement is to be used from a hydraulic cement and a colloidal clay which can be mixed as needed without the disadvantages of stocking multiple types of cement-clay premixes. The clay and cement can, by this means, be added individually to the water to provide a uniform slurry of cement and clay.

This invention, therefore, comprises the utilization of from about 0.5 percent to about 10 percent, and preferably from about 0.75 percent to about 4 percent, based on the water content of the cement-clay slurry, of at least one salt of the group consisting of the sodium, lithium, potassium, and ammonium salts of formic, acetic, nitrous, chloroacetic, gluconic, and tartaric acids as agents to retard the swelling of the colloidal clay and to make possible the ready and efficient preparation of cementing slurries.

The cementing compositions are prepared as follows. One of the above-indicated salts, for example, sodium formate, is dissolved in water to give an aqueous solution containing about 0.5 percent to about 10 percent and preferably from about 0.75 percent to about 4 percent of such salt. Calcium or equivalent lignosulfonate salt or lignosulfonic acid, hereinafter referred to as "water soluble lignosulfonate," in a very small amount, for example, about 0.1 percent to about 1 percent, dry cement basis, is then added to increase plasticity or workability of the wet cement by retarding the cement setting time. The colloidal clay is then dispersed in the aqueous medium to give a smooth suspension, followed by the addition and agitation of the dry cement to give a smooth fluid mix. The proportions of the dry cement and colloidal clay are those conventionally used, for example, from about 40 percent to about 70 percent by weight cement, slurry basis, and about 4 percent to about 40 percent by weight clay, dry cement basis.

Any hydraulic cement conventionally used for oil well cementing can be used, such as Portland cement (ASTM Type I), slow set and high early strength cements. Suitable colloidal clays include bentonite, El Paso surface clays, and montmorillonites and their alkali and alkaline earth metal salts.

The amount of sodium formate or equivalent salt required to retard the swelling of the colloidal clay is dependent to a considerable extent on the amount of clay used in making the slurry. When relatively small amounts of clay are used, less than about 4 percent by weight of the salt, water basis, is required to maintain fluidity. When relatively larger amounts of clay are used, say about 12 percent to 25 percent, about 4 percent of the salt is required to suppress the swelling of the clay to maintain fluidity of the cement slurry. Larger amounts of clay require up to about 10 percent of the salt, water basis. For most practical purposes from about 0.75 percent to about 4 percent water basis is the preferred range of the salt required to retard the swelling of the clay.

The following tables present specific embodiments of the invention and blanks for comparison. Parts and percentages therein are by weight unless otherwise noted. The cement-clay slurries of the invention were prepared as indicated above.

Table I

[Amount of materials used to prepare 1 liter of cement slurry, containing the various percentages of bentonite. In all cases, 0.5% by weight of calcium lignosulfonate (based on the cement) was added.]

| Test | Bentonite | | Portland Cement (ASTM Type I) | Water (ml.) | Density (lb./gal.) |
|---|---|---|---|---|---|
| | Final Percentage | Amt. used in grams | | | |
| 1 (Blank) | 4.0 | 43 | 1,077 | 609 | 14.6 |
| 2 (Blank) | 12.0 | 98 | 815 | 675 | 13.4 |
| 3 (Blank) | 25.0 | 137 | 547 | 763 | 12.0 |

Table II

[Effect of various concentrations of sodium formate on bentonite-cement slurries containing 0.5% of calcium lignosulfonate (based upon the weight of cement). (For composition, see Table I.) The amount of sodium formate is based on the amount of water in the slurry.]

| Test | Bentonite Percentage | Sodium Formate Percentage | Fluidity [1] (r.p.m.) | Fluid Loss [2] (ml./30 min.) |
|---|---|---|---|---|
| 1 (Blank) | 4 | Conventional dry mix: bentonite-cement premixed in dry state. | 1,100 | ([3]) |
| 2 | 4 | 4.0 | 1,100 | ([3]) |
| 3 | 4 | 1.0 | 1,000 | ([3]) |
| 4 | 4 | 0.75 | 875 | ([3]) |
| 5 | 4 | 0.50 | 750 | ([3]) |
| 6 (Blank) | 4 | None | Lumped badly | ([3]) |
| 7 (Blank) | 12 | Conventional dry mix: bentonite-cement premixed in dry state. | 1,200 | 75 |
| 8 | 12 | 4.8 | 1,000 | 93 |
| 9 | 12 | 4.0 | 1,000 | 90 |
| 10 | 12 | 3.7 | 900 | 87 |
| 11 | 12 | 3.5 | 600 | 85 |
| 12 | 12 | 3.0 | 280 | 77 |
| 13 (Blank) | 12 | None | Lumped badly making a stiff gel. | ([3]) |
| 14 | 25 | 4.0 | 1,100 | 117 |

[1] Fluidity is a measure of viscosity or pumpability using the Stormer viscosimeter (divided mud cup and cylindrical spindle) with a 400 gram weight.
[2] Fluid loss is measured following the A.P.I. procedure, Code No. 29 (1949).
[3] Not measured.

Table III

[Various salts used to allow separate addition of bentonite and cement. A 12% bentonite slurry, as in Table I, test 2, was used in all of the following tests.]

| Test | Salt | Salt Concentration based on amount of water (%) | Fluidity, r.p.m. |
|---|---|---|---|
| 1 (Blank) | None | Dry pre-mix | 1,100 |
| 2 (Blank) | do | Bentonite followed by cement. | 0 |
| 2A (Blank) | do | Cement followed by bentonite. | 0 |
| 3 | Sodium Formate | 4 | 1,000 |
| 4 | Sodium Acetate | 4 | 1,000 |
| 5 | Sodium Nitrite | 4 | 1,100 |
| 6 | Sodium Chloroacetate | 6 | 1,100 |
| 7 | Sodium Gluconate | 10 | 1,100 |
| 8 | Rochelle Salt | 10 | 1,100 |
| 9 (Blank) | Order: Water, sodium formate, cement, bentonite. | 4 | 0 |

The above table shows the advantageous effect on fluidity of cement of the various salts used in comparison with a premix. The table also shows that the colloidal clay must precede the cement in order of mixing.

What is claimed is:

1. In a cementing composition consisting of a hydraulic cement, from about 4 percent to about 40 percent of a colloidal clay of the group consisting of bentonite, El Paso surface clays, montmorillonites, and their alkali and alkaline earth metal salts, dry cement basis, and water, the improvement which consists in an addition of from about 0.5 percent to about 10 percent by weight, water basis, of a member of the group consisting of lithium, sodium, potassium and ammonium salts of formic, acetic, nitrous, chloroacetic, gluconic and tartaric acids.

2. In a cementing composition consisting of a hydraulic cement, from about 4 percent to about 40 percent of a colloidal clay of the group consisting of bentonite, El Paso surface clays, montmorillonites, and their alkali and alkaline earth metal salts, dry cement basis, and water, the improvement which consists in an addition of from about 0.75 percent to about 4 percent by weight, water basis, of a member of the group consisting of lithium, sodium, potassium, and ammonium salts of formic, acetic, nitrous, chloroacetic, gluconic and tartaric acids.

3. A cementing composition consisting of a hydraulic cement, from about 4 percent to about 40 percent by weight of a colloidal clay of the group consisting of bentonite, El Paso surface clays, montmorillonites, and their alkali and alkaline earth metal salts, dry cement basis, from about 0.1 percent to about 1 percent of a water soluble lignosulfonate, from about 0.5 percent to about 10 percent by weight, water basis, of a member of the group consisting of lithium, sodium, potassium, and ammonium salts of formic, acetic, nitrous, chloroacetic, gluconic, and tartaric acids, and water sufficient to provide a fluid slurry.

4. A cementing composition consisting of a hydraulic cement, from about 4 percent to about 40 percent by weight of a colloidal clay of the group consisting of bentonite, El Paso surface clays, montmorillonites, and their alkali and alkaline earth metal salts, dry cement basis, from about 0.1 percent to about 1 percent of a water soluble lignosulfonate, from about 0.75 percent to about 4 percent by weight, water basis, of a member of the group consisting of lithium, sodium, potassium, and ammonium salts of formic, acetic, nitrous, chloroacetic, gluconic, and tartaric acids, and water sufficient to provide a fluid slurry.

5. A method of preparing cementing compositions which consists in dissolving a member of the group consisting of lithium, sodium, potassium, and ammonium salts of formic, acetic, nitrous, chloroacetic, gluconic, and tartaric acids in water, dispersing from about 4 percent to about 40 percent by weight of a colloidal clay of the group consisting of bentonite, El Paso surface clays, montmorillonites, and their alkali and alkaline earth metal salts in the resulting solution, dry cement basis, and then dispersing a hydraulic cement therein to give a composition containing from about 0.5 percent to about 10 percent by weight, water basis, of said salt.

6. A method of preparing cementing compositions which consists in dissolving a member of the group consisting of lithium, sodium, potassium, and ammonium salts of formic, acetic, nitrous, chloroacetic, gluconic, and tartaric acids in water, adding a water-soluble lignosulfonate thereto, dispersing from about 4 percent to about 40 percent by weight of a colloidal clay of the group consisting of bentonite, El Paso surface clays, montmorillonites, and their alkali and alkaline earth metal salts in the resulting solution, dry cement basis, and then dispersing a hydraulic cement therein to give a composition consisting of hydraulic cement, from about 4 percent to about 40 percent by weight of said colloidal clay, dry cement basis, from about 0.1 percent to about 1 percent of a water soluble lignosulfonate, from about 0.75 percent to about 4 percent by weight, water basis, of a member of the group consisting of lithium, sodium, potassium, and ammonium salts of formic, acetic, nitrous, chloroacetic, gluconic, and tartaric acids, and water sufficient to provide a fluid slurry.

References Cited in the file of this patent

UNITED STATES PATENTS

| | | |
|---|---|---|
| 1,755,502 | Collings | Apr. 22, 1930 |
| 2,174,051 | Winkler | Sept. 26, 1939 |
| 2,474,330 | Salathiel | June 28, 1949 |
| 2,526,674 | Larsen | Oct. 24, 1950 |
| 2,545,169 | Salathiel | Mar. 13, 1951 |
| 2,582,459 | Salathiel | Jan. 15, 1952 |
| 2,646,360 | Lea | July 21, 1953 |
| 2,673,810 | Ludwig | Mar. 30, 1954 |
| 2,705,050 | Davis | Mar. 29, 1955 |

OTHER REFERENCES

Pages 247–249 of Searles' book entitled "The Chemistry and Physics of Clays and Other Ceramic Materials" (1924). A print of these pages to be found in Class 252–8.5C.

Article by C. W. Davis on "The Swelling of Bentonite and its Control" founded on pages 1350–1351 of the Industrial and Engineering Chemistry, December 1927 (vol. 19, No. 12).